United States Patent
Amalraj Victory Raja

(10) Patent No.: US 12,500,754 B2
(45) Date of Patent: Dec. 16, 2025

(54) GET KEY BOT FOR SECURELY MAINTAINING AND PROVIDING PASSPHRASES

(71) Applicant: NetApp, Inc., San Jose, CA (US)

(72) Inventor: Amalraj Victory Raja, Karnataka (IN)

(73) Assignee: NetApp, Inc., San Jose, CA (US)

( * ) Notice: Subject to any disclaimer, the term of this patent is extended or adjusted under 35 U.S.C. 154(b) by 77 days.

(21) Appl. No.: 18/625,345

(22) Filed: Apr. 3, 2024

(65) Prior Publication Data

US 2025/0317286 A1    Oct. 9, 2025

(51) Int. Cl.
H04L 9/08    (2006.01)
H04L 9/40    (2022.01)

(52) U.S. Cl.
CPC ............. *H04L 9/088* (2013.01); *H04L 63/08* (2013.01)

(58) Field of Classification Search
CPC .................. H04L 9/088; H04L 3/08
See application file for complete search history.

(56) References Cited

U.S. PATENT DOCUMENTS

| | | | |
|---|---|---|---|
| 10,360,099 B2 | 7/2019 | Subramanian et al. | |
| 10,521,143 B2 | 12/2019 | Subramanian et al. | |
| 11,036,420 B2 | 6/2021 | Thoppil et al. | |
| 11,048,430 B2 | 6/2021 | Thoppil et al. | |
| 11,132,339 B2 | 9/2021 | Kaushik et al. | |
| 11,151,162 B2 | 10/2021 | Narasingarayanapeta et al. | |
| 11,210,013 B2 | 12/2021 | Thoppil et al. | |
| 11,615,001 B2 | 3/2023 | Naidu et al. | |
| 11,650,886 B2 | 5/2023 | Mathew et al. | |
| 11,853,104 B2 | 12/2023 | Naidu et al. | |
| 12,294,572 B2 * | 5/2025 | Wang | H04L 63/045 |
| 2017/0323087 A1 | 11/2017 | Kline et al. | |
| 2018/0332042 A1 | 11/2018 | Yu et al. | |
| 2022/0217143 A1 | 7/2022 | Williams et al. | |
| 2023/0032814 A1 | 2/2023 | Pandurangan | |
| 2023/0412367 A1 | 12/2023 | Bennison | |
| 2025/0080329 A1 * | 3/2025 | Bruno | H04L 9/14 |

OTHER PUBLICATIONS

"FabricPool tier management", NetApp, URL: https://docs.netapp.com/us-en/ontap/pdfs/sidebar/FabricPool_tier_management.pdf, Apr. 16, 2024, 58 pages.
"HA pair management", NetApp, URL: https://docs.netapp.com/us-en/ontap/pdfs/sidebar/HA_pair_management.pdf, Apr. 16, 2024, 26 pages.
"SVM data mobility", NetApp, URL: https://docs.netapp.com/us-en/ontap/pdfs/sidebar/SVM_data_mobility.pdf, Apr. 16, 2024, 14 pages.

* cited by examiner

*Primary Examiner* — Benjamin A Kaplan
(74) *Attorney, Agent, or Firm* — Cooper Legal Group, LLC

(57) ABSTRACT

Techniques are provided for a get key bot that securely provides access to passphrases. A set key workflow is executed to generate a get key executable binary that is implemented as the get key bot. The get key executable binary is encapsulated with encrypted information that includes a verified user identifier, a passphrase, and/or a bot expiry time. Upon receiving a request for the passphrase from a requestor, the get key executable binary is invoked. The encrypted information is decrypted and compared to a logged-in user identifier and current time for verification. In response to successful verification, the passphrase is provided to the requestor. Otherwise, the requestor is denied access to the passphrase.

20 Claims, 13 Drawing Sheets

```
^@^@^@^@p^@^@^@tdP^@^@^@^@^@^@v^@v^@^@^@
^@^@^@^@/lib64/ld-linux-x86-64.so.2^@^@^@^@^@GNU
^@libc.so.6^@stack_chk_fail^@popen^@fgets^@strlen^@
^@stdout^@malloc^@strcat^@stderr^@getlogin^@pclose
^@fwrite^@fprint^@cxa_finalize^@strcmp^@libc_start_main
^@GLIBC2.4^@ITM_deregisterTMCloneTable^@^@^@
Gmon-start^@ITM_registerTMCloneTable^@^@^@

"mykey" [noeol][converted] 39L, 14756C
```

FIG. 6E

GET KEY BOT FOR SECURELY MAINTAINING AND PROVIDING PASSPHRASES

BACKGROUND

Many applications, services, and computing environments provide security through various authentication mechanisms. In an example, a user may log into a bank website, a social network, a cloud computing environment, a mobile app, a virtual machine, or an application hosted by a computing device using a login name and password. Unfortunately, the user may be able to only memorize and remember a few short passwords. It is difficult to memorize lengthy passwords having a complex combination of characters, which is problematic when many applications and services require complex passwords. Thus, users often write down passwords on a written document or store the passwords within computer storage such as a text file for easy access. However, storing passwords in a written document or computer storage poses a security risk because the passwords can be easily stolen or compromised.

DESCRIPTION OF THE DRAWINGS

FIGS. 6A-6E are block diagrams illustrating examples of a command line interface accessing a get key bot in accordance with an embodiment of the present technology.

DETAILED DESCRIPTION

Figure 1A:
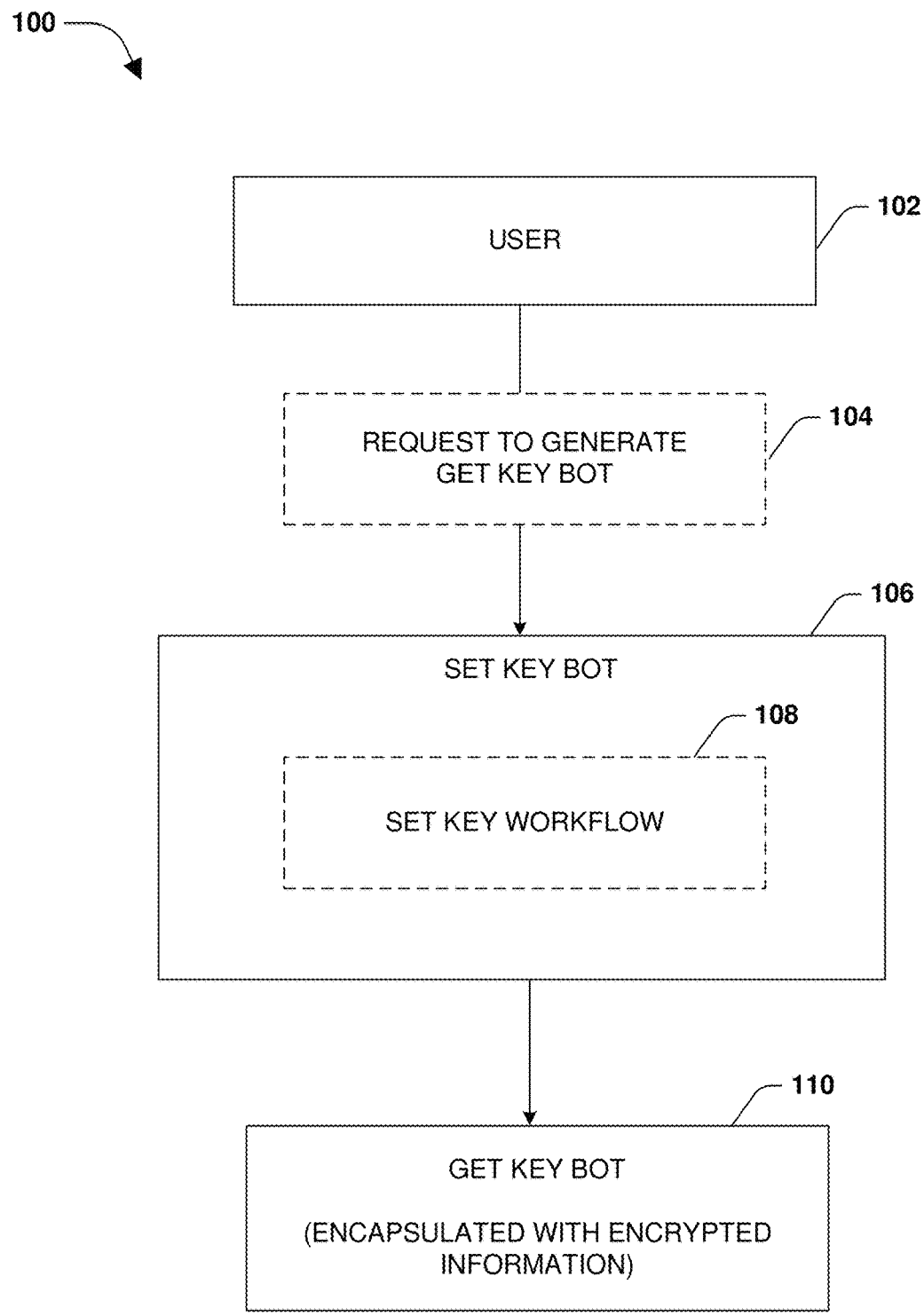
FIG. 1A is a block diagram illustrating an example of a system for generating a get key bot in accordance with an embodiment of the present technology.

Some examples of the claimed subject matter are now described with reference to the drawings, where like reference numerals are generally used to refer to like elements throughout. In the following description, for purposes of explanation, numerous specific details are set forth to provide an understanding of the claimed subject matter. It may be evident, however, that the claimed subject matter may be practiced without these specific details. Nothing in this detailed description is admitted as prior art.

Security is a high priority for most users, businesses, and other entities. Many applications and services store information that is only made accessible to authenticated users. Various types of security may be implemented such as authentication of user login credentials that could include a username and password, biometric authentication such as a retinal scan, a onetime authentication password, a password generator app, etc. Many applications and services require complex passwords that are difficult for a human to memorize and remember. This becomes even more problematic when the user has accounts with numerous applications and services. The user may resort to using the same password, writing passwords down on paper, or storing the passwords on a computer for easy access. However, the passwords physically written on the paper could be easily lost or stolen, and the passwords stored on the computer could be hacked or stolen.

When a user runs an application, the user can manually input a passphrase (e.g., a password, a secret, or other credentials) such as from human memory in order to authenticate with the application. However, when an application runs through an automated environment or setup (e.g. an application running through a developer platform such as GitHub), the application may require that passwords must be input as plain text through an automation script or as a command line input. Conventional methods for automated password input through a script or command line interface are very susceptible to being hacked by malicious entities. Accordingly, there is a need for a mechanism to provide passphrases (e.g., passwords, secrets, or other authentication credentials) silently to an application without human intervention. The mechanism needs to provide passphrases silently to an owner (a user that owns the passphrase or an authenticated user designated as being allowed to access the passphrase) and/or an application or service.

The disclosed systems and methods provide for a get key bot that is capable of securely managing and providing passphrases to users, applications, and services. The get key bot may be implemented as a silent password teller bot used to silently, such as without manual user intervention, provide passphrases to authenticated users provided with permission to access the passphrases, an owner of the passphrase, and/or applications and services. The get key bot is generated as an executable binary (e.g., a user generated executable binary medium) that can be invoked through a command line interface to provide passphrases back through the command line interface or called inside the application coding (e.g., application coding of an application may call the get key bot). The get key bot is encapsulated with encrypted passphrase keys that are each paired with a key name. A requestor (e.g., a user, application, or server) may provide a key name to the get key bot that will return a passphrase associated with a passphrase key paired with the key name. The get key bot can provide the passphrase to an application during runtime of the application, such as through a command line interface or where the get key bot is called from inside the application itself. In this way, the get key bot can silently, without human intervention, provide passphrases to applications executing within an automated environment. For example, an application can request a passphrase by programmatically inputting a command through a command line interface to execute a get key executable binary that returns the passphrase through the command line interface back to the application based upon successful verification. The get key bot can maintain a set of passphrase key/value pairs that can each be used for various applications (e.g., a first passphrase key/value pair for a first application, a second passphrase key/value pair for a second application, a passphrase key/value pair for a virtual machine, etc.). It may be appreciated that the get key bot can be configured to securely store and provide other information and is not limited to passphrases, but can also be generated for any text (e.g. a login-username, a server IP, a database name, a date of birth, a social security number, an email ID, sensitive text, etc.).

In order to generate the get key executable binary as the get key bot, a set key bot is implemented as an executable binary. Similar to the get key bot, the set key bot can be invoked through a command line interface that calls and executes the set key executable binary of the set key bot. The set key bot obtains and encrypts information such as an owner identifier, identifiers of authorized users, passphrases, device identifiers (e.g., machine IP or MAC addresses of devices allowed to access certain passphrases), and/or a bot expiry time corresponding to a timeframe during which the get key bot will be valid for providing the passphrases. In this way, encrypted information is generated and encapsulated into the get key executable binary which is created by the set key bot. In some embodiments, the set key bot generates C-Code for the get key bot and builds the get key executable binary encapsulated within the encrypted information using the C-Code.

The get key bot can be called by a requestor for a passphrase, such as by a user through the command line interface and/or by an application or service. The get key bot decrypts the encrypted information such as in a runtime of the application to determine whether a logged-in user identifier, a current device identifier, a current time and/or a key name specified by the requestor are valid with respect to the decrypted information. That is, the get key bot, which may be called through the command line interface and/or is executed through the runtime of the application as the get key executable binary, may obtain the logged-in user identifier, the current device identifier, and/or the current time from a device hosting the get key bot (e.g., obtained from an operating system kernel of the device). If the logged-in user identifier and the current device identifier match a whitelisted user identifier and device identifier within the decrypted information and the current time indicates that the bot expiry time has not expired, then a passphrase that is paired with the key name is obtained and provided to the requestor. Otherwise, the get key bot denies access to the passphrase. In addition to storing passphrases for various applications and services, the get key bot and the set of key can be used to store protected environment variables that cannot be seen or accessed by external or unauthorized users (e.g., applications and automation may use operating system global environment variables for certain values and data, and the variables and values can be security stored and provided through the get key bot.

Because the get key bot is generated as a single executable binary that can be run through a command line interface to silently (without human intervention) provide passphrases, the get key bot can be transported/migrated from one device to another device and operate without any extra libraries (e.g., workflows of the get key bot and the set key bot can be implemented with C code using basic C programming libraries, and extra libraries or tools such as GPG encryption can be optionally used for encryption and decryption, however, custom encryption methods can be implemented within the workflows such as to protect sensitive information without the need for the extra/eternal libraries or tools). Additionally, only the owner of a passphrase or whitelisted users (or applications/services on behalf of such users when running in an automated environment) specified through the set key bot during creation of the get key bot are allowed to access the passphrase. Super users such as root users, admin users, and/or pseudo users are not provided with privilege or access to the get key bot beyond that of a normal user, and thus such users are treated as normal users. In some embodiments, passphrases are only shared with the owner, a specifically specified user, or a user that has created the get key bot.

FIG. 1A is a block diagram illustrating an example of a system 100 for generating a get key bot 110. A bot component (e.g., bot component 713 of FIG. 7) may be configured to generate the get key bot 110 based upon a request 104 received from a user 102. In some embodiments, the bot component is hosted by a computing device as a set key bot 106 implemented as an executable binary. The executable binary of the set key bot 106 may be executed through a command line interface through which the request 104 may be received. In some embodiments, the user 102 may input the request 104 as: root@k8s-Colleen:/home/cbc/bin #./setkey "MyPassw@rd!" "Colleen" through the command line interface. The ./setkey portion of the request 104 may identify the executable binary of the set key bot 106 to execute. The "MyPassw@rd!" may be the passphrase to encrypt and encapsulate as encrypted information within a get key executable binary that will be created by the set key bot 106 as the get key bot 110. "Colleen" may be set as the whitelisted user (a verified user identifier of an owner of the passphrase) that is allowed to access the passphrase. Colleen may be allowed to directly execute the get key bot 110 to access the passphrase. Within an automated environment, an application, executing on a device where Colleen is logged in, can directly execute the get key bot 110 to access the passphrase (e.g., the application may input the command through a command line interface to trigger execution of the get key bot 110 that will provide the passphrase to the application back through the command line interface based upon successful verification).

In some embodiments, the user 102 may input the request 104 as: root@k8s-Colleen:/home/cbc/bin #/setkey "MyPassw@rd!" "Colleen, jenkin s-sqa-ssh, Pete" through the command line interface. The ./setkey portion of the request 104 may identify the executable binary of the set key bot 106 to execute. The "MyPassw@rd!" may be the passphrase to encrypt and encapsulate as encrypted information within the get key executable binary that will be created by the set key bot 106 as the get key bot 110. "Colleen, jenkins-sqa-ssh, Pete" may be set as 3 whitelisted users (3 verified user identifiers) that are allowed to access the passphrase. The 3 whitelisted users may be allowed to directly execute the get key bot 110 to access the passphrase. Within an automated environment, an application, executing on a device where any of the 3 whitelisted users are logged in, can directly execute the get key bot 110 to access the passphrase (e.g., the application may input the command through a command line interface to trigger execution of the get key bot 110 that will provide the passphrase to the application back through the command line interface based upon successful verification).

In response to receiving the request 104 from the user 102 to generate the get key bot 110, the set key bot 106 executes a set key workflow 108. The set key workflow 108 creates encrypted information utilizing information from the request 104. In some embodiments, the set key workflow 108 utilizes an encryption mechanism (e.g., an encryption key such as an in-built predefined encryption key that will be built into and/or is encapsulated within the get key bot 110, or any other encryption mechanism) to create the encrypted information. The set key workflow 108 encrypts the passphrase MyPassw@rd!, the verified user identifier(s) such as Colleen, a bot expiry time (e.g., the request 104 may specify that the get key bot 110 is to be valid for 15 days, or a preconfigured expiry time may be used such as a default of 30 days or not bot expiry time may be used), and/or device identifiers. The request 104 may specify certain device IP or MAC addresses of devices that are allowed access the passphrase, or a current device IP or MAC address may be used as a default device identifier or no device identifier may be specified so that there is no device restriction. The set key workflow 108 generates the get key executable binary that is encapsulated with the encryption information and includes the encryption mechanism such as the in-built predefined encryption key. In this way, the get key bot 110 is created.

Figure 1B:
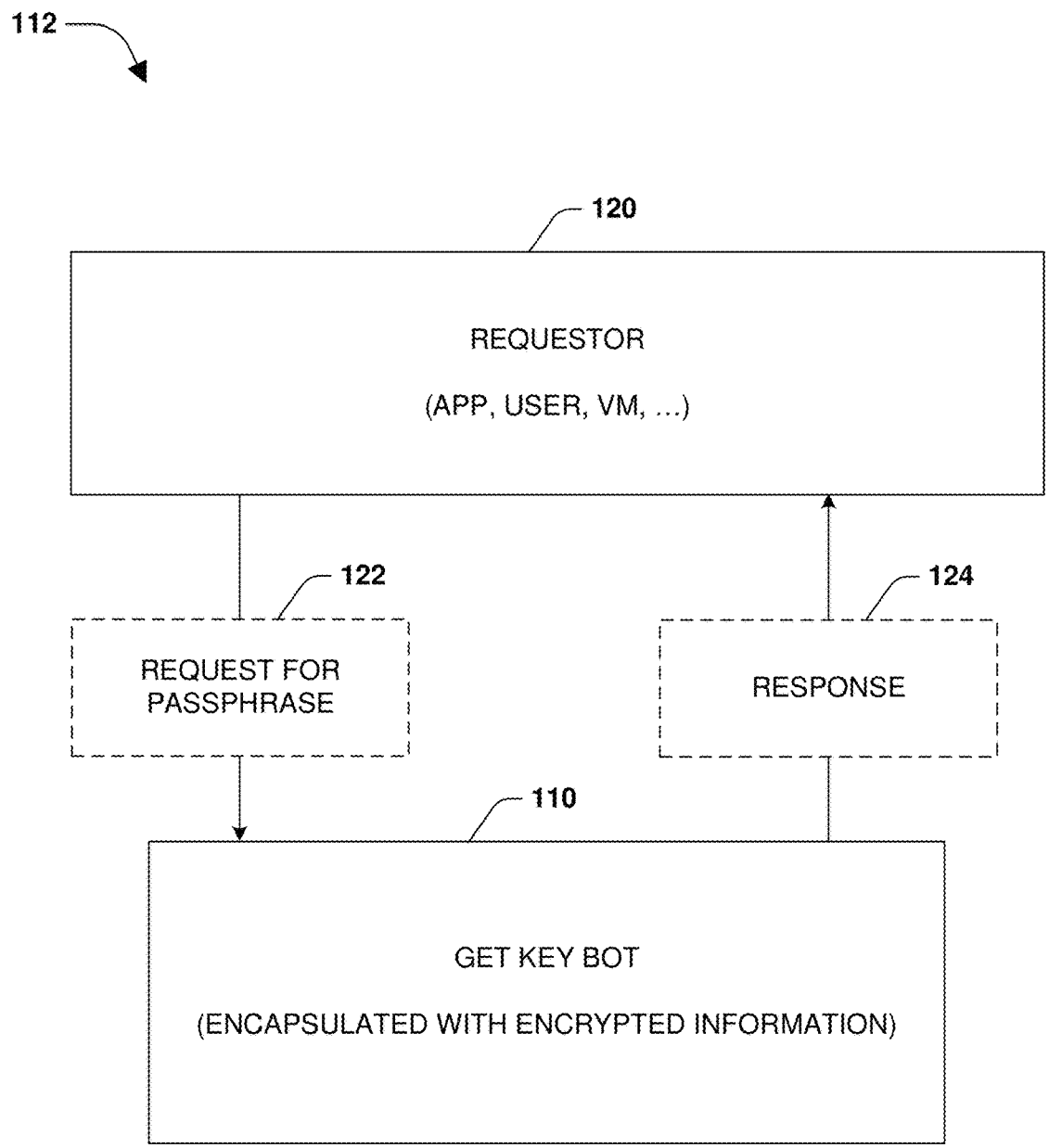
FIG. 1B is a block diagram illustrating an example of a system including a get key bot processing a request for a passphrase in accordance with an embodiment of the present technology.

FIG. 1B is a block diagram illustrating an example of a system 112 including the get key bot 110 processing a request 122 for a passphrase. The get key bot 110 may have been generated by the set key bot 106 of FIG. 1A based upon the request 104 from the user 102. The get key bot 106 is stored as a get key executable binary, which may be invoked through a command line interface according to some embodiments. A requestor 120 may submit a request 122 to the get key bot 110 for a passphrase such as the passphrase MyPassw@rd!. The requestor 120 (e.g., an application) may be executing on a device that may also host the get key bot 110 (e.g., the get key binary may be stored within storage or memory of the device hosting the requestor 120). The requestor 120 may be an application, a virtual machine, a user, or some other entity requesting access to the passphrase. In some embodiments, the request 122 may be issued as a command through the command line interface, such as "root@k8s-Colleen:/home/cbc #./mykey." The command may trigger the execution of the get key executable binary of the get key bot 110 through the command line interface where the mykey is merely a renamed get key binary, for example. Likewise, multiple get key bots could be created and renamed with different names for serving different secrets for different purposes, which may improve efficiency, throughput, parallelism, portability, and security.

The get key bot 110 may utilize the in-built predefined encryption key to decrypt the encrypted information in order to obtain the passphrase MyPassw@rd!, the verified user identifier(s) such as Colleen, the bot expiry time, and/or the device identifiers. The get key bot 110 may obtain a logged-in user identifier of a user current logged into the device hosting the get key bot 110, a current time, and/or a current device identifier of the device, which may be obtained from the device such as from an operating system kernel of the device. The get key bot 110 may determine whether the logged-in user identifier matches a verified user identifier. If there is no match, then a response 124 that access is denied may be provided back to the requestor 120. If the decrypted information includes one or more device identifiers, then get key bot 110 may determine whether the current device identifier matches the one or more device identifiers. If there is no match, then the response 124 that access is denied may be provided back to the requestor 120. The get key bot 110 may determine whether the get key bot 110 is valid/allowed to provide the passphrase based upon whether the current time is within a timeframe specified by the bot expiry time during which the get key bot 110 is valid/allowed to provide the passphrase and has not expired (e.g., the get key bot 110 is allowed to provide the passphrase from March 3rd at 3:00 pm Eastern until March 20th at 12:00 pm Eastern). If the bot expiry time has expired (e.g., the current time is not within the timeframe from March 3rd at 3:00 pm Eastern until March 20th at 12:00 pm Eastern), then the response 124 that access is denied may be provided back to the requestor 120.

If the get key bot 110 determines that the logged-in user identifier matches a verified user identifier, that the bot expiry time indicates that the get key bot 110 is currently valid for providing the passphrase, and that a current device identifier of the device hosting the requestor 120 matches a device identifier (if there are any device identifiers optionally specified by the decrypted information), then the get key bot 110 silently passes the passphrase as the response 124 to the requestor 1120 (e.g., without human intervention). In some embodiments, the passphrase is provided as the response 124 through the command line interface such as through a command line response to a user. In some embodiments, the passphrase is provided as the response 124 through an automated environment hosting the requestor 120 (an application_.

Figure 2:
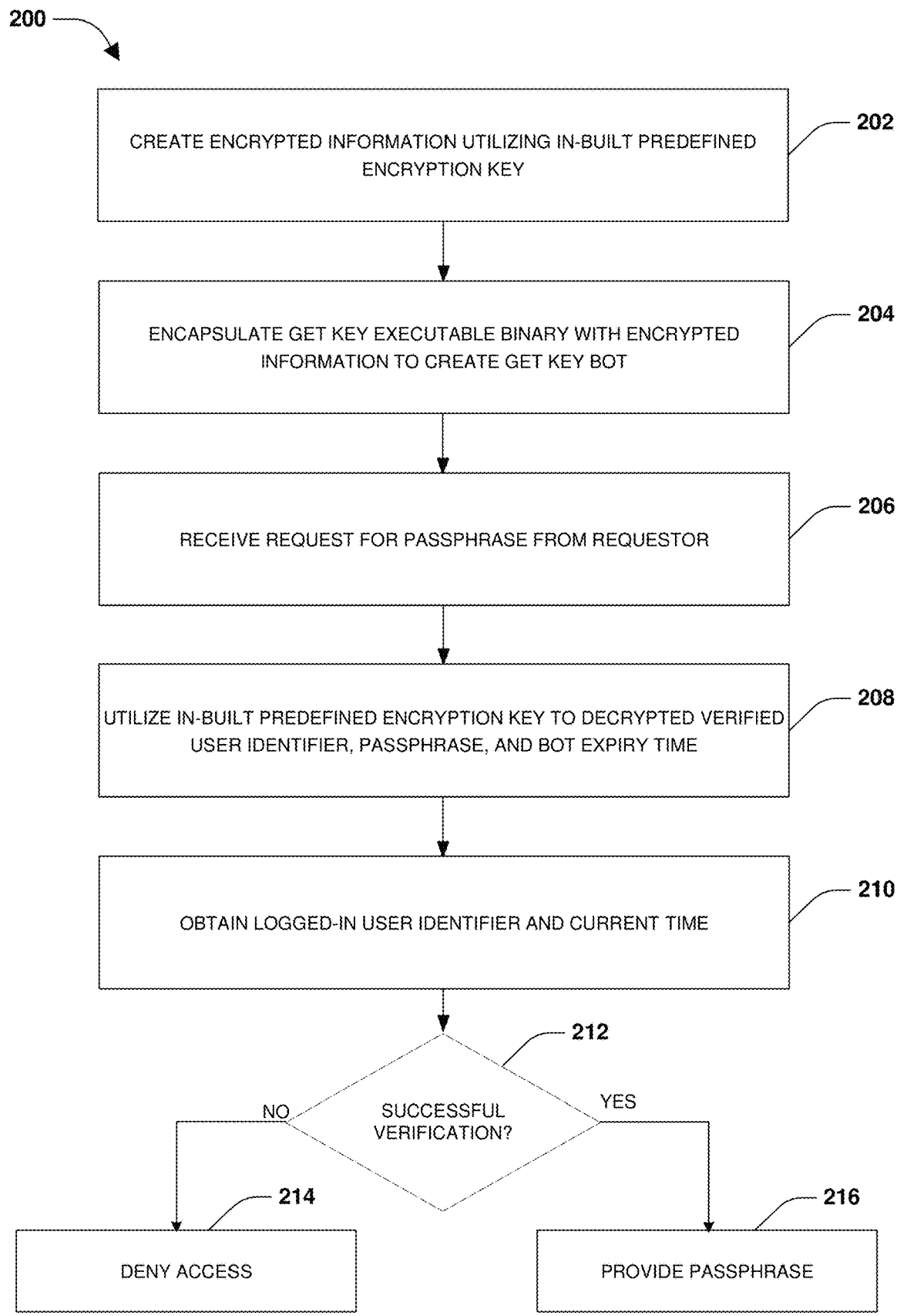
FIG. 2 is a flow chart illustrating an example method for generating and operating a get key bot in accordance with an embodiment of the present technology.
Figure 3:
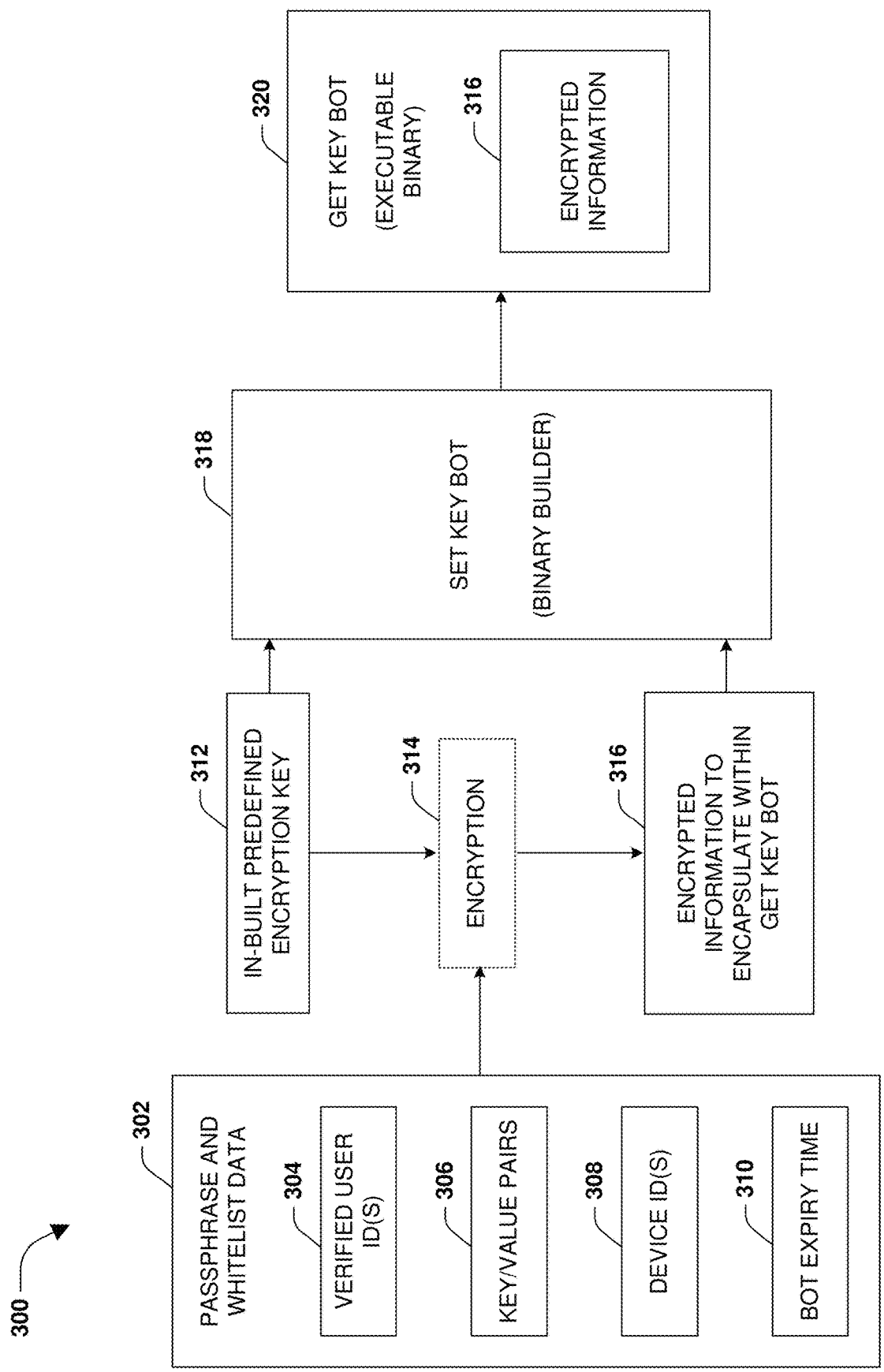
FIG. 3 is a block diagram illustrating an example of a system for generating a get key bot in accordance with an embodiment of the present technology.
Figure 4:
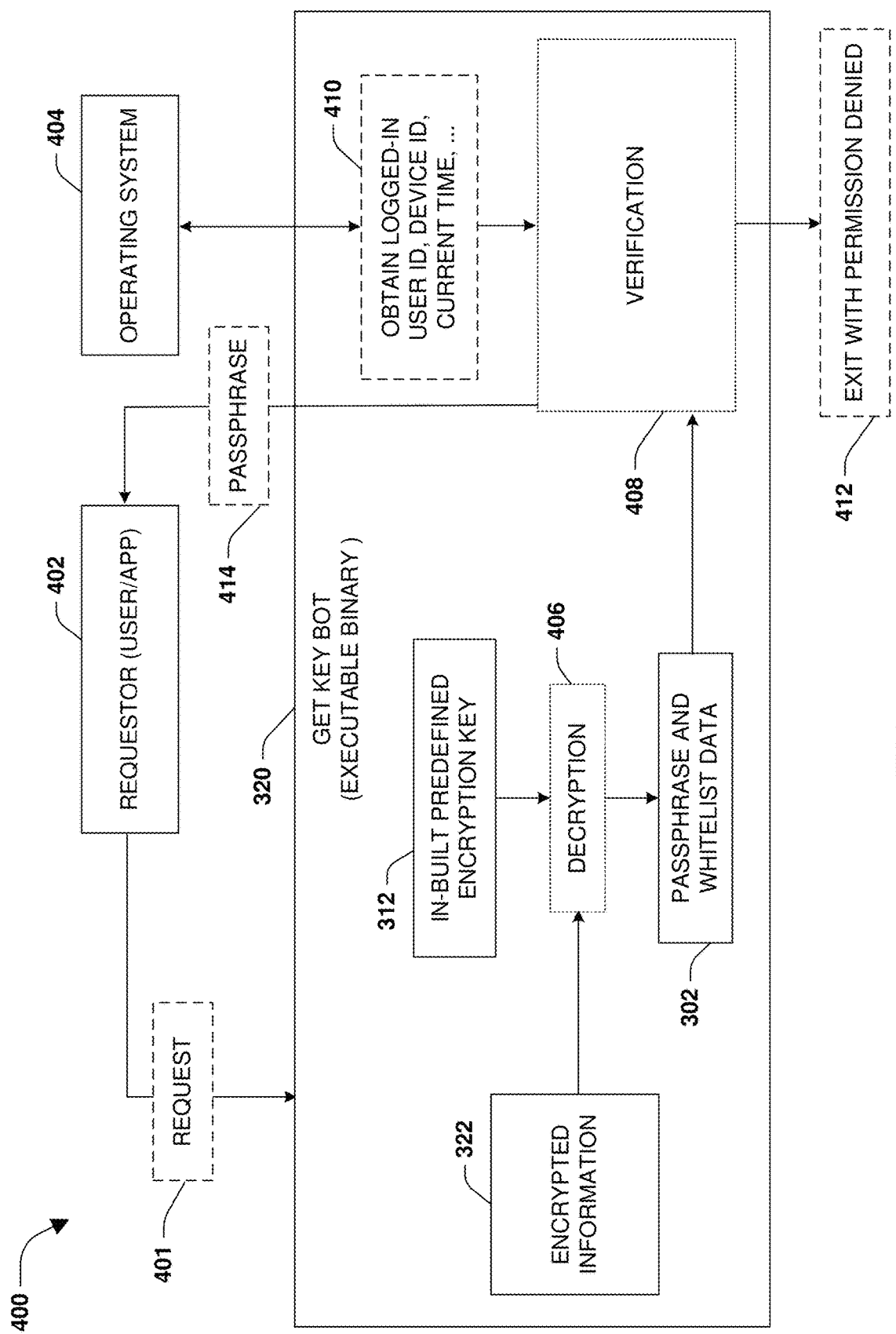
FIG. 4 is a block diagram illustrating an example of a system including a get key bot processing a request for a passphrase in accordance with an embodiment of the present technology.

FIG. 2 is a flow chart illustrating an example method 200 for generating and operating a get key bot 320, which is described in conjunction with system 300 of FIG. 3 and system 400 of FIG. 4. A set key bot 318 may be implemented as an executable binary that is configured as a binary builder to create/build a get key executable binary as the get key bot 320, as illustrated by FIG. 3. The set key bot 318 may be configured with an in-built predefined encryption key 312 that is securely stored within the executable binary of the set key bot 318 for creating the get key bot 320. The in-built predefined encryption key 312 may be securely stored within the get key executable binary that is being built by the set key bot 318 to create the get key bot 320.

A set key workflow may be executed by the set key bot 318 to generate the get key executable binary. In some embodiments, the set key workflow may be invoked in response to receiving a command through a command line interface that calls an executable binary of the set key bot 318. In some embodiments, the set key bot 318 is executed to generate C-Code for executing the set key workflow to create the get key bot 320. In this way, the C-Code is used by the set key bot 318 to generate the get key executable binary to create the get key bot 320.

The set key workflow may utilize the in-built predefined encryption key 312 to perform an encryption process 314 to encrypt passphrase and whitelist data 302 (a whitelist). In some embodiments, the command may define at least some of the passphrase and whitelist data 302. In some embodiments, at least some of the passphrase and whitelist data 302 may be predefined such as where default values are used if the command doesn't specify values. In some embodiments, a user that owns a host device hosting the set key bot 318 is granted access to define information populated within the passphrase and whitelist data 302 (the whitelist).

In some embodiments, the passphrase and whitelist data 302 includes verified user identifiers 304, passphrases defined as key/value pairs 306 (e.g., a key/value pair may include a passphrase paired with an application, service, virtual machine, or other requestor that can be provided with the passphrase), device identifiers 308 such as a machine IP address or a machine MAC address (e.g., the device identifiers 308 may be optionally specified to restrict access to a passphrase to requestors hosted on particular devices identified by the device identifiers 308), and/or a bot expiry time 310 specifying a timeframe during which the get key bot 318 is valid for providing passphrases. In some embodiments, the bot expiry time 310 may be specified for the entire set key bot 318. In some embodiments, different bot expiry times may be specified for different passphrases, and thus the set key bot 318 may be valid for providing a first passphrase, but not valid for providing a second passphrase based upon a current time being within a bot expiry time for the first passphrase, but being outside a bot expiry time for the second passphrase. In some embodiments, a whitelist specified by the passphrase and whitelist data 302 includes a bot expiry date and time until which a whitelisted user (a whitelisted user associated with a verified user identifier) is to be given access to a designated passphrase, otherwise, the whitelisted user is denied access to the designated passphrase during times outside of the bot expiry date and time. In some embodiments, the passphrase and whitelist data 302 includes a whitelist populated with user identifiers of whitelisted users that are allowed to access passphrases (e.g., the verified user identifiers 304), passphrase names, values associated with the passphrases (e.g., the actual password or secret), and/or the device identifiers.

During operation 202 of method 200, the set key workflow utilizes the in-built predefined encryption key 312 to execute the encryption process 314. The encryption process 314 encrypts the passphrase and whitelist data 302 to create encrypted information 316 for encapsulation within the get key executable binary of the set key bot 318. In some embodiments, the encrypted information 316 includes the verified user identifiers 304, the key/value pairs 306, the device identifiers 308, and/or the bot expiry time 310. In some embodiments, protected environment variables are encrypted as part of the encrypted information 316 in order to hide the protected environment variables from external and unauthorized users. During operation 204 of method 200, the get key executable binary is encapsulated with the encrypted information 316 and the in-built predefined encryption key 312 as part of the set key bot 318 creating the get key bot 320. In this way, the get key bot 320 is created by the set key bot 318. In some embodiments, the get key bot 320 and/or the set key bot 318 are hosted as a silent password teller bot as a user generated executable binary used to silently provide (tell) passphrases (e.g., passwords, secrets, etc.) to requestors without human intervention such as to applications executed in an automated environment without user oversight.

The get key executable binary of the get key bot 320 may be stored on a computing device. The get key executable binary may be executed based upon an execution command entered by a requestor 402 such as through a command line interface. The requestor 402 may be a user interacting with the command line interface, an application, a service, a virtual machine, or other type of requestor. During operation 206 of method 200, a request 401 is received from the requestor 402, such as through the command line interface, for a passphrase 414, as illustrated by FIG. 4. In some embodiments, the request 401 may be part of the execution command used to trigger the execution of the get key executable binary of the get key bot 320. Thus, the request 401 may invoke/trigger execution of the get key bot 320. In some embodiments such as where the get key bot 320 (the get key executable binary) is executed as part of the runtime of an application (the requestor 402), the request 401 is verified as being received during runtime of the application in order for the get key bot 320 to process the request 401, otherwise, the request 401 may be denied. If the request 401 is for a password that is part of a key/value pair that pairs the password with the application, then the request 401 may be verified as being received during runtime of the application in order for the request 401 to be processed.

During operation 208 of method 200, the in-built predefined encryption key 312 is used by the get key bot 320 to decrypt 406 the encrypted information 322 in order to obtain the passphrase and whitelist data 302, such as the verified user identifiers 304, the key/value pairs 306, the device identifiers 308, and/or the bot expiry time 310. During operation 210 of method 200, the get key bot 320 obtains 410 a logged-in user identifier, a current time, a current device identifier, and/or other information from the device hosting the requestor 402 such as from an operating system 404 of the device.

The get key bot 320 performs a verification 408 to determine whether the request 401 is successfully verified, during operation 212 of method 200. If the verification 408 does not pass, then access to the passphrase 414 is denied 412, during operation 214 of method 200. If the verification 408 passes, then the passphrase 414 is provided to the requestor 402, during operation 216 of method 200. As part of the verification 408, the get key bot 320 determines whether the logged-in user identifier matches a verified user identifier of a whitelisted user specified by the passphrase and whitelist data 302. If there is no match, then access to the passphrase 414 is denied 412. As part of the verification 408, the get key bot 320 determines whether the bot expiry time has expired or whether the current time is within the timeframe specified by the bot expiry time. If the current time is not within the timeframe specified by the bot expiry time, then access to the passphrase 414 is denied 412. If passphrase and whitelist data 302 includes one or more device identifiers, then the current device identifier obtained from the device is compared with the one or more device identifiers to determine whether there is a match as part of the verification 408. If there is no match, then access to the passphrase 414 is denied 412. If none of the verifications fail, then the passphrase 414 is provided to the requestor 402.

In some embodiments, the requestor 402 may be a user. The get key bot 320 is configured to override any privileges provided to certain types of users so that the get key bot 320 treats all users the same. For example, additional privileges provided to super users, root users, admin users, pseudo users, and/or other types are users compared to normal users are overridden and ignored when determining whether such users have access to the passphrase 414. Instead, these and all users are treated as normal users that must be explicitly defined by the passphrase and whitelist data 302 as having authorization in order to access the passphrase 414. In this way, additional access privileges are overridden by the get key bot 320 when performing the verification 408. In some embodiments, the get key bot 320 restricts access to the passphrase 414 except for an owner and/or authenticated users (a whitelisted user associated with a verified user identifier within the passphrase and whitelist data 302). For example, super users, root users, admin users, pseudo users, and/or other types are users are denied from accessing the passphrase 414 is such users are not the owner and/or authenticated users.

In some embodiments, the get key bot 320 may provide a single password or secret by default. Using the set key bot 318, the get key bot 320 can be created with a set of passwords/secrets with labels for each password or secret, similar to a dictionary. Each password or secret can be obtained by calling a get key function with a corresponding label. The labels and passwords/secrets are encrypted and encapsulated within the get key executable binary. In some embodiments, a set key function is executed to create a set of passwords assigned to the get key bot 320 to manage.

Each password is assigned its own unique label. The set of passwords and labels are encrypted and encapsulated within the get key executable binary. In response to the get key bot 320 receiving a get key command specifying a label, the set of passwords are queried using the label to identify a password assigned the label. If the verification 408 passes, then the password (e.g., the passphrase 414) is provided to the requestor 402.

In some embodiments, the set key function is input through a command line interface as a command such as: {'My-Linux-VM-1': 'password1', 'My-Linux-VM-2': 'password2', 'Email-Password': 'password3', 'My-DB-IP': '10.222.11.33'}. The command creates a first label 'My-Linux-VM-1' for a first password 'password1', a second label 'My-Linux-VM-2' for a second password 'password2', a third label 'Email-Password' for a third password 'password3', and a fourth label 'My-DB-IP' for a device identifier (machine IP) '10.222.11.33'. In order to obtain the password, a get key command may be input through the command line interface, such as: $ getkey-label 'Email-Password' that results in an output of the password: password3'.

Figure 5:
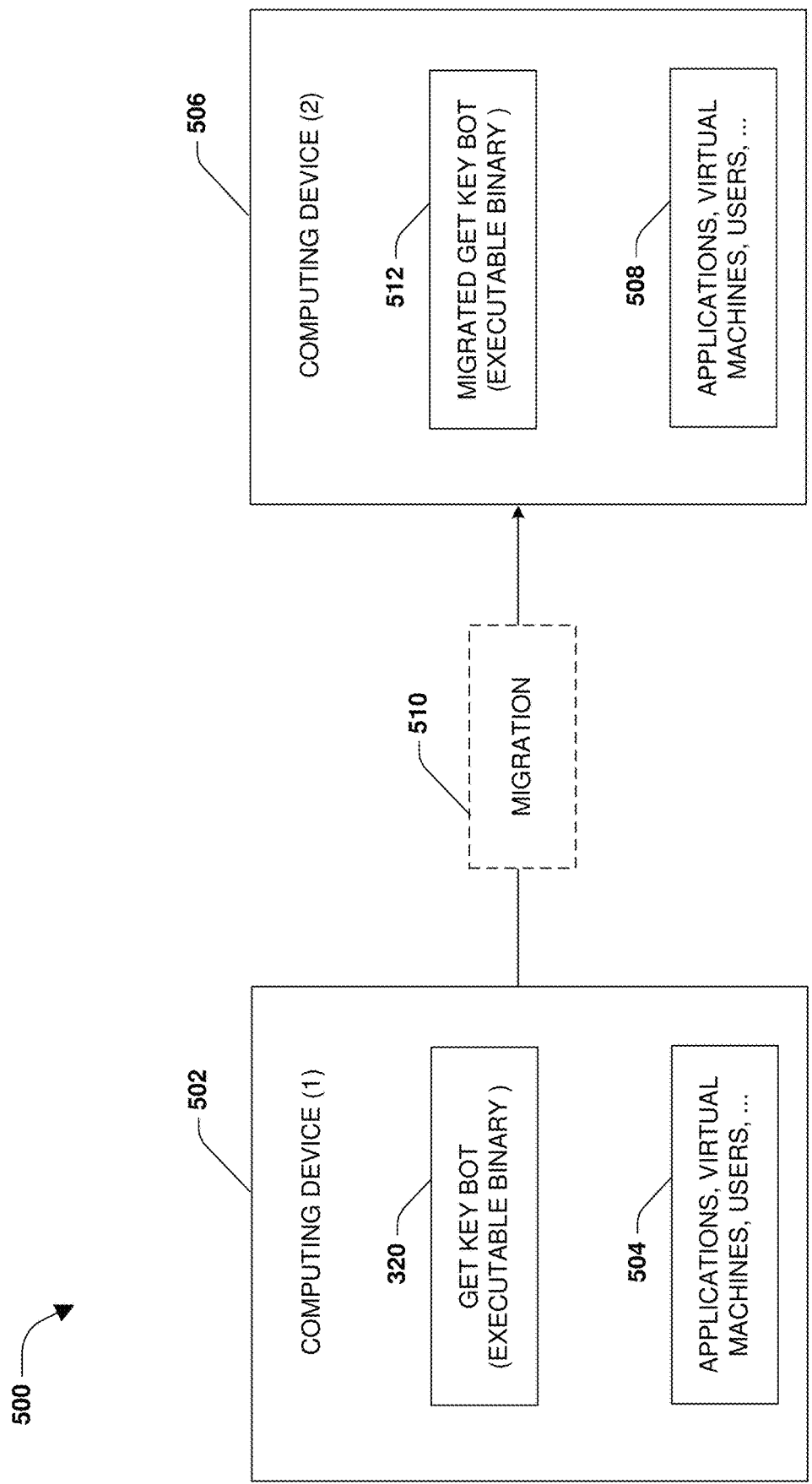
FIG. 5 is a block diagram illustrating an example of a system for migrating a get key bot between computing devices in accordance with an embodiment of the present technology.

FIG. 5 is a block diagram illustrating an example of a system 500 for migrating the get key bot 320 between computing devices. The get key bot 320 may be stored as a get key executable binary on a first computing device 502. Applications, virtual machines, users, and services 504 on the first computing device 502 may invoke the get key bot 320, such as by inputting commands through a command line interface, to provide a passphrase in response to successful verification.

Figure 6A:
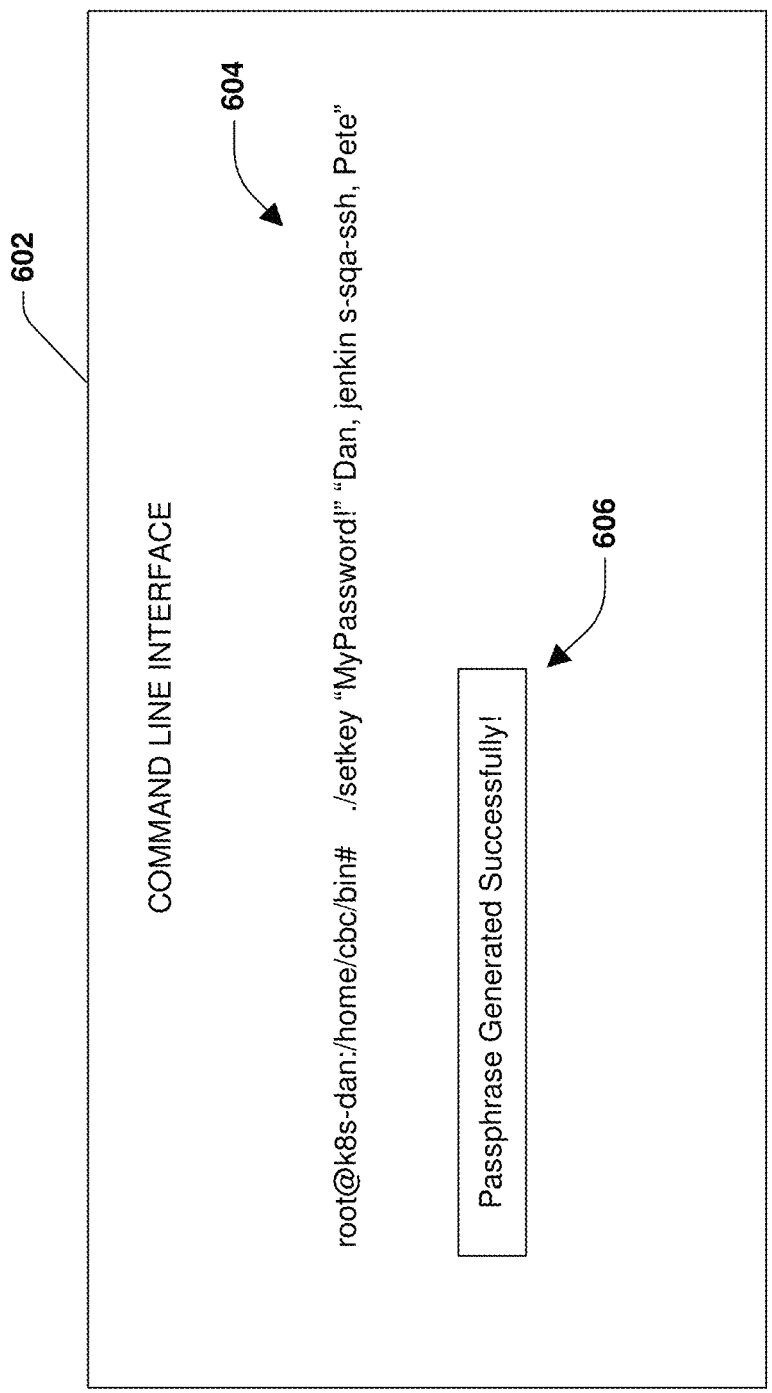

The get key bot 320 may have been created as a first portable executable binary by a set key bot that is stored as a second portable executable binary. The get key bot 320 and the set key bot can be separately migrated/transported from one computing device to a different computing device, and are standalone bots that can be separately executed without reliance on one another. For example, the get key bot 320 and the set key bot may be initially hosted at the first computing device 502. The first portable executable binary of the get key bot 320 may be migrated 510 (transported) from the first computing device 502 to a second computing device 506 as a migrated get key bot 512. Because the migrated get key bot 512 is stored as the first portable executable binary within the second computing device 506, applications, virtual machines, users, and services 508 on the second computing device 506 may invoke the migrated get key bot 512, such as by inputting commands through a command line interface, to provide a passphrase in response to successful verification FIGS. 6A-6E are block diagrams illustrating examples of a command line interface 602 accessing a get key bot. FIG. 6A illustrates the command line interface 602 being used to invoke a set key bot to generate a get key bot. A command 604 may be input through the command line interface 602 to trigger execution of an executable binary of the set key bot to create a get key executable binary representing the get key bot. The command 604 may specify: root@k8s-dan:/home/cbc/bin #/setkey "MyPassword!" "Dan, jenkin s-sqa-ssh, Pete." A user Dan may be currently logged into a computing device hosting the command line interface 602 (e.g., Dan may be logged into a k8s Kubernetes environment), and may input the command 604 through the command line interface 602. The command 604 includes: /setkey that is used to call the set key bot. The command 604 includes "MyPassword!" that is the passphrase to be encrypted and encapsulated within the get key bot. The command 604 includes "Dan, jenkin s-sqa-ssh, Pete" that specifies 3 verified users that are allowed to access the passphrase (e.g. user Dan, user Pete, and a special user jenkins-sqa-ssh). In this way, the command 604 is performed to execute the executable binary of the set key bot to create the get key executable binary for generating the get key bot. The passphrase and the 3 verified users are encrypted and encapsulated within the get key executable binary. If no device identifiers were specified, then a current device identifier (e.g., a user must be logged into a specified computing device when attempting to access the passphrase) or no device identifier (e.g., a user can be logged into any computing device when attempting to access the passphrase) may be encrypted and encapsulated within the get key executable binary. If no bot expiry time was specified, then a default bot expiry time (e.g., 10 days from a current date and time) or no bot expiry time (e.g., the get key bot does not expire) may be encrypted and encapsulated within the get key executable binary. In response to successful creation of the get key bot, a success message 606 is displayed through the command line interface.

Figure 6B:
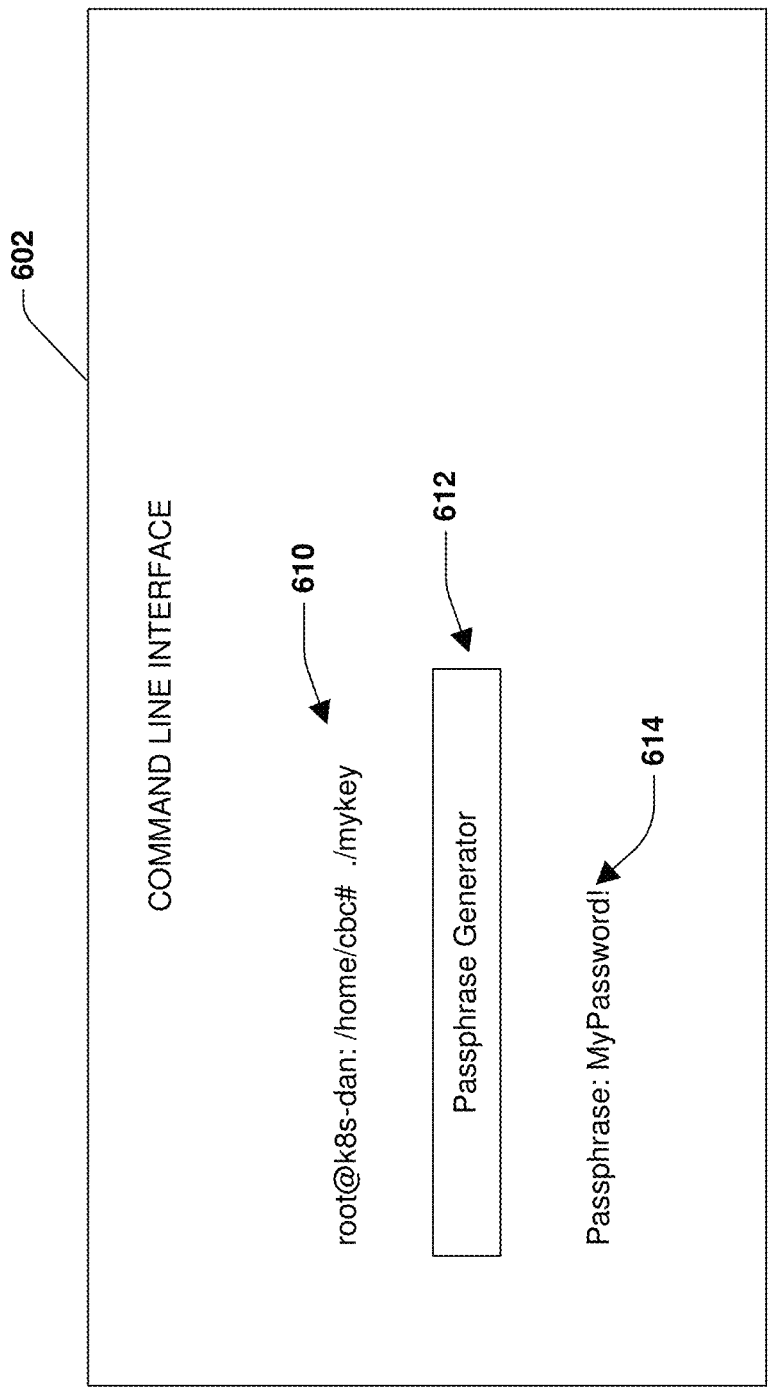
Figure 6C:
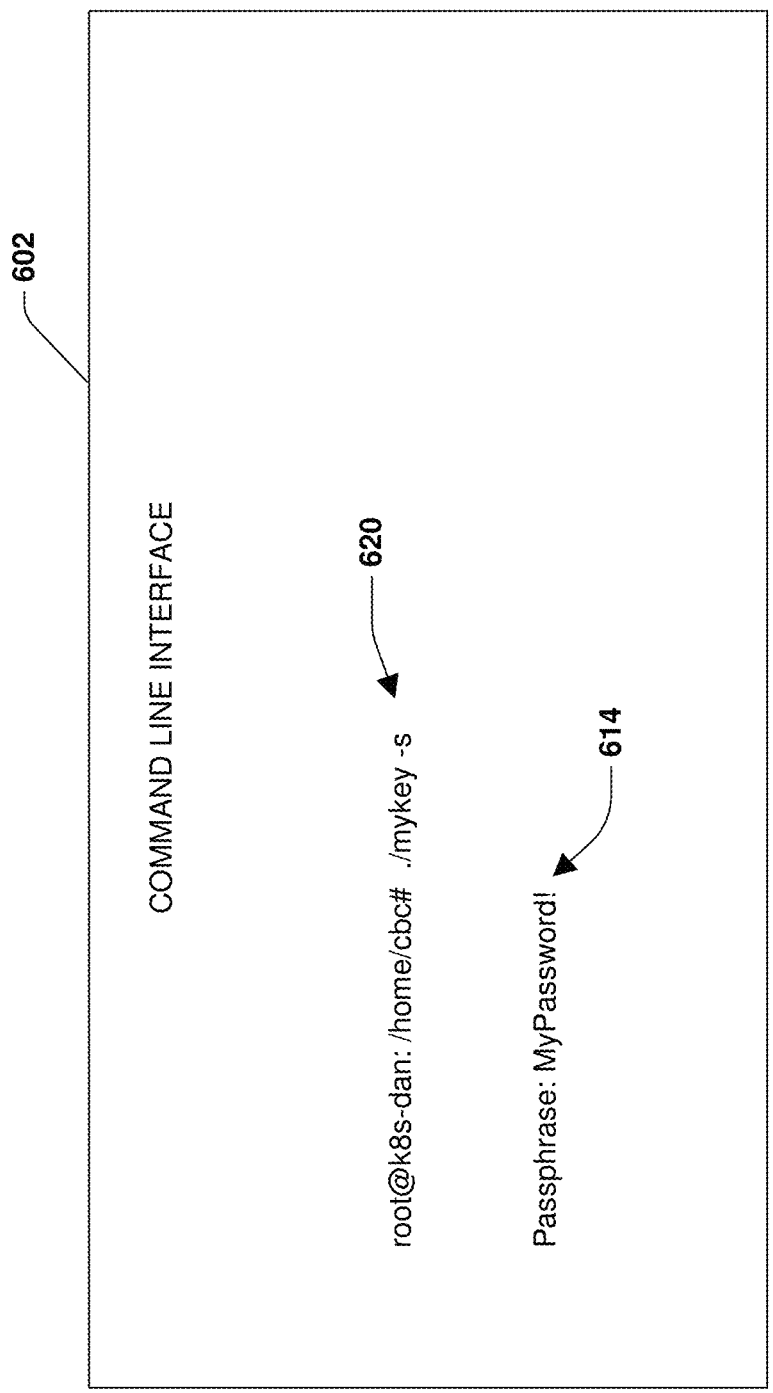

FIG. 6B illustrates the command line interface 602 being used to invoke a get key bot to provide a passphrase through the command line interface 602. A command 610 may be input through the command line interface 602 to trigger execution of a get key executable binary of the get key bot to provide the passphrase. The command 604 may specify: root@k8s-dan:/home/cbc #./mykey. A user Dan may be currently logged into a computing device hosting the command line interface 602 (e.g., Dan may be logged into a k8s Kubernetes environment), and may input the command 610 through the command line interface 602. The command 610 includes: /mykey that is used to call the get key bot by executing the get key executable binary. If the get key bot successfully verifies the command 610, then a notification 612 is provided with the passphrase 614 through the command line interface 602. In some embodiments, the notification 612 is not displayed if a command includes a "-s" such as the command 620 root@k8s-dan:/home/cbc #./mykey-s, as illustrated by FIG. 6C. If the get key bot does not successfully verify the command 610, then an access denied notification may be provided through the command line interface 602.

If the requestor was an application or service calling the get key bot through the command line interface 602 by programmatically inputting the command 610 into the command line interface 602, then the get key bot inputs the passphrase 614 into the application or service through the command line interface 602. In this way, the passphrase can be silently, without human intervention, requested and provided through the command line interface 602 for applications or services hosted within an automated environment. In some embodiments, it is not the get key bot that is logging into the application or service in order to access the application or service, but the get key bot is implemented as a silent password teller that is merely providing the password (e.g., and is not providing a full login such as username and password because the get key bot is not logging into the application or service) through the command line interface 602 to the application or service.

Figure 6D:
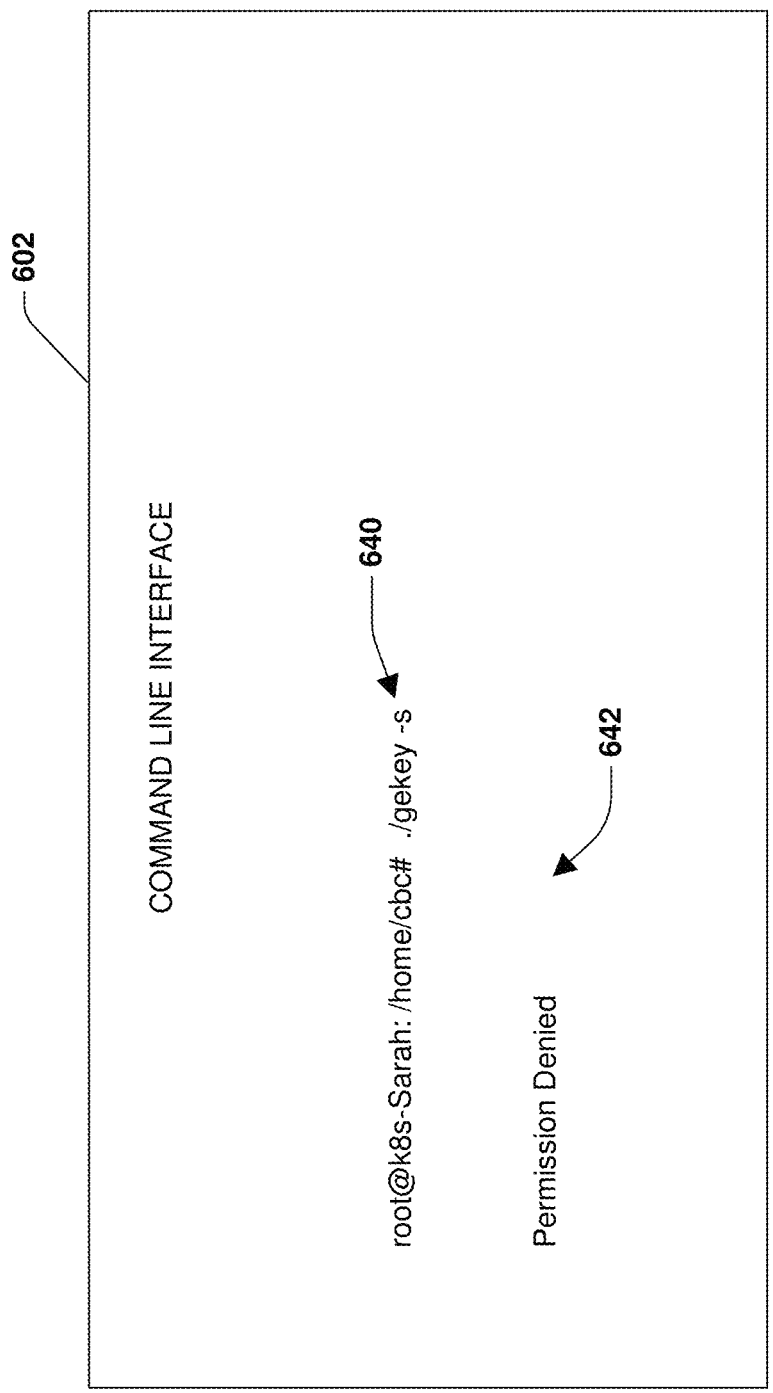

FIG. 6D illustrates the command line interface 602 being used to invoke a get key bot to provide a passphrase through the command line interface 602. A command 640 may be input through the command line interface 602 to trigger execution of a get key executable binary of the get key bot to provide the passphrase. The command 640 may specify: root@k8s-Sarah:/home/cbc #/mykey. A user Sarah may be currently logged into a computing device hosting the command line interface 602 (e.g., Sarah may be logged into a k8s Kubernetes environment), and may input the command 640 through the command line interface 602. The command 640 includes: /mykey that is used to call the get key bot by executing the get key executable binary. The get key bot may not successfully verify Sarah as having access to the passphrase, and thus an access denied notification 642 may be provided through the command line interface 602.

FIG. 6E illustrate a get key executable binary 650 within which passphrase and whitelist data is encrypted and encapsulated in a secure manner where unauthorized users cannot access passphrases that are encrypted and encapsulated into the get key executable binary 650 of a get key bot.

In some embodiments, a method is provided. The method includes executing a set key workflow to generate a get key executable binary implemented as a get key bot, wherein the executing comprises: creating encrypted information utilizing an in-built predefined encryption key to encrypt a verified user identifier, a passphrase, and bot expiry time corresponding to a timeframe during which the get key bot is valid for providing the passphrase; and encapsulating the get key executable binary with the encrypted information to create the get key bot; and in response to the get key bot receiving a request for the passphrase from a requestor, invoking the get key executable binary to: utilize the in-built predefined encryption key to decrypt the verified user identifier, the passphrase, and the bot expiry time from the encrypted information; obtain a logged-in user identifier and a current time from a device executing the get key executable binary to implement the get key bot; and in response to successfully verifying that the logged-in user identifier matches the verified user identifier and that the current time is within the timeframe specified by the bot expiry time, providing the passphrase to the requestor, otherwise, deny access to the passphrase.

In some embodiments, the method includes utilizing the in-built predefined encryption key to encrypt, for inclusion within the encrypted information, a device identifier of a designated device allowed to utilize the get key bot, wherein the device identifier comprises at least one of a machine IP address or a machine MAC address.

In some embodiments, the method includes in response to receiving the request, obtaining a current device identifier of the designated device; and in response to successfully verifying that the logged-in user identifier matches the verified user identifier, that the current time is within the timeframe specified by the bot expiry time, and that the current device identifier matches the device identifier, providing the passphrase to the requestor, otherwise, denying access to the passphrase.

In some embodiments, the method includes creating a key value pair to include the passphrase paired with an application; and utilizing the in-built predefined encryption key to encrypt the key value pair for inclusion within the encrypted information.

In some embodiments, the method includes creating a whitelist to include key value pairs of passphrases and applications or virtual machines paired with the passphrases; and utilizing the in-built predefined encryption key to encrypt the whitelist for inclusion within the encrypted information.

In some embodiments, the method includes implementing a set key bot to generate C-Code for executing the set key workflow to create the get key bot.

In some embodiments, the method includes generating, by the set key bot, the get key executable binary using the C-Code to create the get key bot.

In some embodiments, the set key bot and the get key bot are hosted as a silent password teller bot as a user generated executable binary.

In some embodiments, a computing device is provided. The computing device includes memory comprising machine executable code, and a processor coupled to the memory, the processor configured to execute the machine executable code to cause the processor to perform operations comprising: executing a set key workflow to generate a get key executable binary implemented as a get key bot, wherein the executing comprises: creating encrypted information utilizing an in-built predefined encryption key to encrypt a verified user identifier, a passphrase, and bot expiry time corresponding to a timeframe during which the get key bot is valid for providing the passphrase; and encapsulating the get key executable binary with the encrypted information to create the get key bot; and in response to the get key bot receiving a request for the passphrase from a requestor, invoking the get key executable binary to: utilize the in-built predefined encryption key to decrypt the verified user identifier, the passphrase, and the bot expiry time from the encrypted information; obtain a logged-in user identifier and a current time from a device executing the get key executable binary to implement the get key bot; and in response to successfully verifying that the logged-in user identifier matches the verified user identifier and that the current time is within the timeframe specified by the bot expiry time, providing the passphrase to the requestor, otherwise, deny access to the passphrase.

In some embodiments, the requestor is an application, and wherein the request is verified as being received during runtime of the application.

In some embodiments, the get key bot restricts access to the passphrase except for an owner or authenticated user specified within the encrypted information, and wherein the get key bot overrides access privileges of a root user or admin user from accessing the passphrase when the root user or the admin user are not specified within the encrypted information as having access to the passphrase.

In some embodiments, the operations comprise maintaining, as part of the encrypted information, a whitelist populated with user identifiers of whitelisted users that are allowed to access passphrases maintained by the get key bot, passphrase names, values associated with the passphrases, and device identifiers of devices from which the passphrases are allowed to be accessed.

In some embodiments, the whitelist is populated with a bot expiry date and time until which a whitelisted user must be given access to a designated passphrase.

In some embodiments, a user that owns a host device hosting the get key bot is granted access to define information populated within the whitelist.

In some embodiments, non-transitory machine readable medium is provided. The non-transitory machine readable medium comprises instructions for performing a method, which when executed by a machine, causes the machine to perform operations including: executing a set key workflow to generate a get key executable binary implemented as a get key bot, wherein the executing comprises: creating encrypted information utilizing an in-built predefined encryption key to encrypt a verified user identifier, a passphrase, and bot expiry time corresponding to a timeframe during which the get key bot is valid for providing the passphrase; and encapsulating the get key executable binary with the encrypted information to create the get key bot; and in response to the get key bot receiving a request for the passphrase from a requestor, invoking the get key executable binary to: utilize the in-built predefined encryption key to decrypt the verified user identifier, the passphrase, and the bot expiry time from the encrypted information; obtain a logged-in user identifier and a current time from a device executing the get key executable binary to implement the get key bot; and in response to successfully verifying that the logged-in user identifier matches the verified user identifier and that the current time is within the timeframe specified by the bot expiry time, providing the passphrase to the requestor, otherwise, deny access to the passphrase.

In some embodiments, the operations comprise utilizing a set key bot and the get key bot to store protected environment variables hidden from external and unauthorized users.

In some embodiments, the set key bot is hosted as a first portable executable binary and the get key bot to is hosted as a second portable executable binary, and wherein the set key bot and the get key bot to can be separately transported from one computing device to a different computing device for execution without external libraries.

In some embodiments the get key bot overrides additional access privileges of super users in relation to normal users, wherein the super users include root users, admin users, and pseudo users.

In some embodiments, the operations comprise utilizing the in-built predefined encryption key to encrypt, for inclusion within the encrypted information, a device identifier of a designated device allowed to utilize the get key bot, wherein the device identifier comprises at least one of a machine IP address or a machine MAC address.

In some embodiments, the operations comprise in response to receiving the request, obtaining a current device identifier of the designated device; and in response to successfully verifying that the logged-in user identifier matches the verified user identifier, that the current time is within the timeframe specified by the bot expiry time, and that the current device identifier matches the device identifier, providing the passphrase to the requestor, otherwise, denying access to the passphrase.

In some embodiments, the operations comprise executing a set key function to create a set of passwords assigned to the get key bot to manage, wherein labels are assigned to the set of passwords, and wherein the set of passwords and labels are encrypted and encapsulated within the get key executable binary; in response to the get key bot receiving a get key command with a label, querying the set of passwords using the label to identify a password assigned the label; and performing a verification to determine whether to provide the password in response to the get key command.

Figure 7:
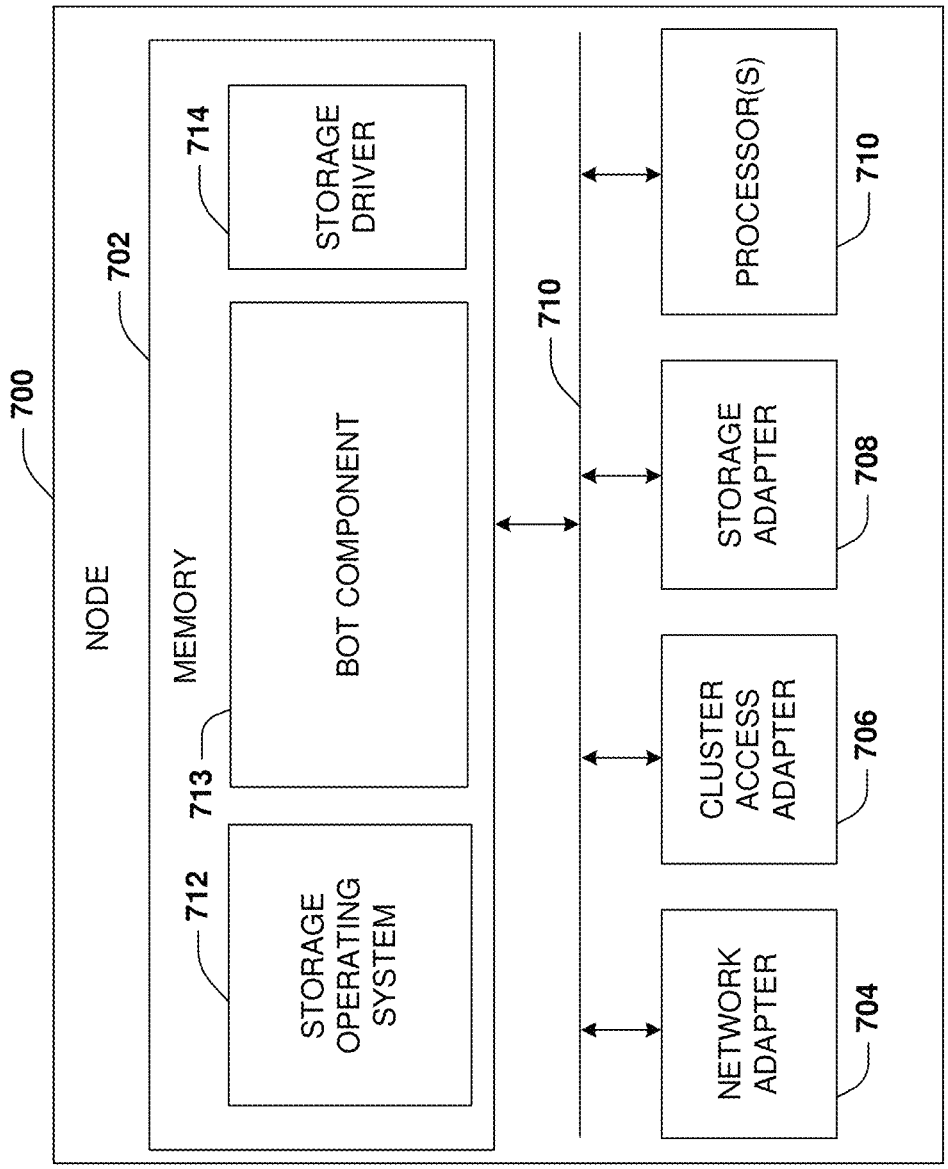
FIG. 7 is a block diagram illustrating an example of a node in accordance with an embodiment of the present technology.

Referring to FIG. 7, a node 700 (also referred to as a storage node) in this particular example includes processor(s) 710, a memory 702, a network adapter 704, a cluster access adapter 706, and a storage adapter 708 interconnected by a system bus 710. In other examples, the node 700 comprises a virtual machine, such as a virtual storage machine.

The node 700 also includes a storage operating system 712 installed in the memory 702 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc.

The network adapter 704 in this example includes the mechanical, electrical and signaling circuitry needed to connect the node 700 to one or more of the client devices over network connections, which may comprise, among other things, a point-to-point connection or a shared medium, such as a local area network. In some examples, the network adapter 704 further communicates (e.g., using Transmission Control Protocol/Internet Protocol (TCP/IP)) via a cluster fabric and/or another network (e.g., a WAN (Wide Area Network)) (not shown) with storage devices of a distributed storage system to process storage operations associated with data stored thereon.

The storage adapter 708 cooperates with the storage operating system 712 executing on the node 700 to access information requested by one of the client devices (e.g., to access data on a data storage device managed by a network storage controller). The information may be stored on any type of attached array of writeable media such as magnetic disk drives, flash memory, and/or any other similar media adapted to store information.

In exemplary data storage devices, information can be stored in data blocks on disks. The storage adapter 708 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 708 and, if necessary, processed by the processor(s) 710 (or the storage adapter 708 itself) prior to being forwarded over the system bus 710 to the network adapter 704 (and/or the cluster access adapter 706 if sending to another node computing device in the cluster) where the information is formatted into a data packet and returned to a requesting one of the client devices and/or sent to another node computing device attached via a cluster fabric. In some examples, a storage driver 714 in the memory 702 interfaces with the storage adapter to facilitate interactions with the data storage devices.

The storage operating system 712 can also manage communications for the node 700 among other devices that may be in a clustered network, such as attached to the cluster fabric. Thus, the node 700 can respond to client device requests to manage data on one of the data storage devices or storage devices of the distributed storage system in accordance with the client device requests.

The node 700 may implement a bot component 713 (e.g., a get key bot and/or a set key bot) configured to perform the techniques described herein such as in relation to FIGS. 1-6E. For example, the bot component 713 may be configured as the set key bot 106 to generate the get key bot 110 or may be implemented as the get key bot 110.

In the example node 700, memory 702 can include storage locations that are addressable by the processor(s) 710 and adapters 704, 706, and 708 for storing related software application code and data structures. The processor(s) 710 and adapters 704, 706, and 708 may, for example, include processing elements and/or logic circuitry configured to execute the software code and manipulate the data structures.

The storage operating system 712, portions of which are typically resident in the memory 702 and executed by the processor(s) 710, invokes storage operations in support of a file service implemented by the node 700. Other processing and memory mechanisms, including various computer readable media, may be used for storing and/or executing application instructions pertaining to the techniques described and illustrated herein.

The examples of the technology described and illustrated herein may be embodied as one or more non-transitory computer or machine readable media, such as the memory 702, having machine or processor-executable instructions stored thereon for one or more aspects of the present technology, which when executed by processor(s), such as processor(s) 710, cause the processor(s) to carry out the steps necessary to implement the methods of this technology, as described and illustrated with the examples herein. In some examples, the executable instructions are configured to perform one or more steps of a method described and illustrated later.

Figure 8:
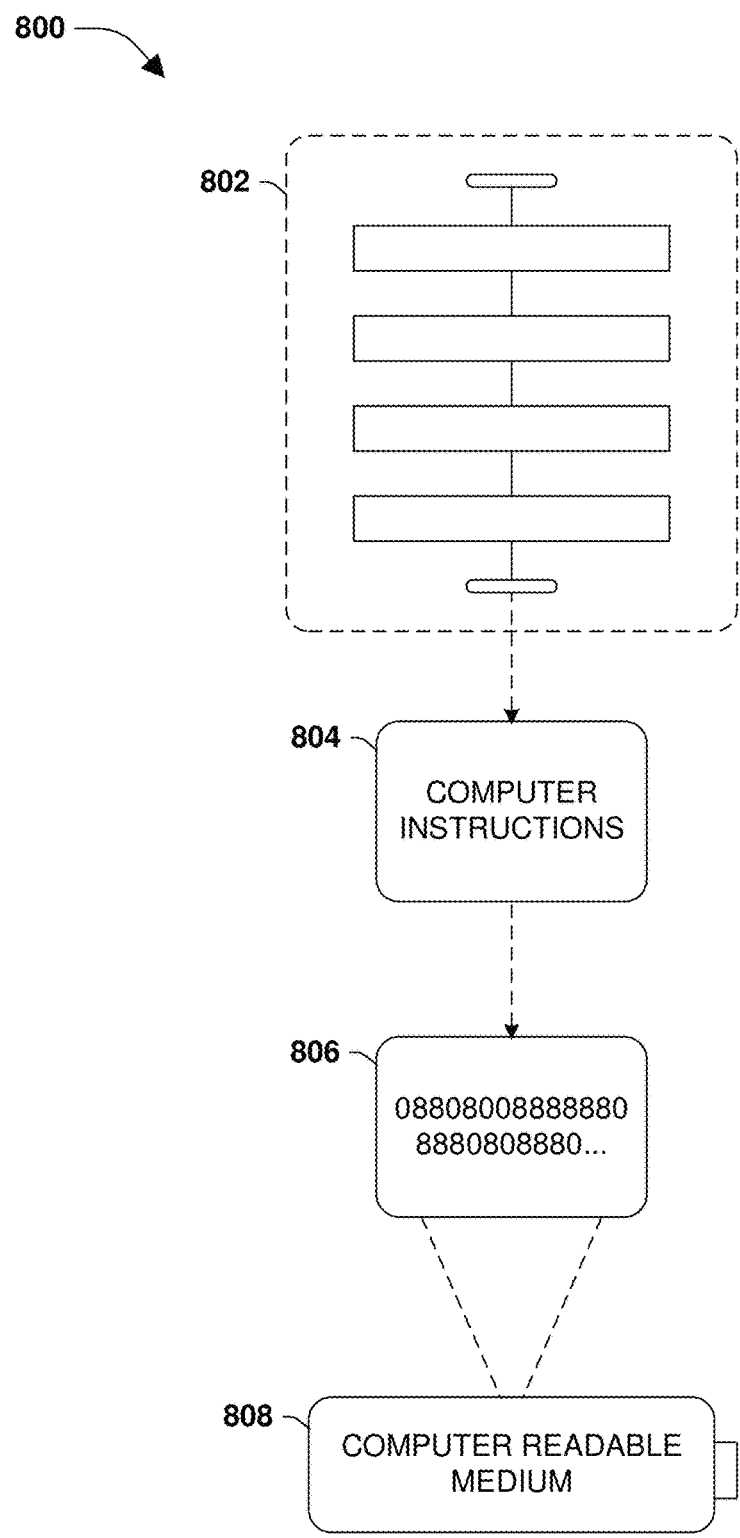
FIG. 8 is an example of a computer readable medium in which an embodiment of the present technology may be implemented.

Still another embodiment involves a computer-readable medium 800 comprising processor-executable instructions configured to implement one or more of the techniques presented herein. An example embodiment of a computer-readable medium or a computer-readable device that is devised in these ways is illustrated in FIG. 8, wherein the implementation comprises a computer-readable medium 808, such as a compact disc-recordable (CD-R), a digital versatile disc-recordable (DVD-R), flash drive, a platter of a hard disk drive, etc., on which is encoded computer-readable data 806. This computer-readable data 806, such as binary data comprising at least one of a zero or a one, in turn comprises processor-executable computer instructions 804 configured to operate according to one or more of the principles set forth herein. In some embodiments, the processor-executable computer instructions 804 are configured to perform a method 802 such as method 200 of FIG. 2. In some embodiments, the processor-executable computer instructions 804 are configured to implement a system such as system 100 of FIGS. 1A and 1B, system 300 of FIG. 3, system 400 of FIG. 4, and/or system 500 of FIG. 5. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (Saas) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
    executing a set key workflow to generate a get key executable binary implemented as a get key bot, wherein the executing comprises:
        creating encrypted information utilizing an in-built predefined encryption key to encrypt a verified user identifier, a passphrase, and bot expiry time corresponding to a timeframe during which the get key bot is valid for providing the passphrase; and
        encapsulating the get key executable binary with the encrypted information to create the get key bot; and
    in response to the get key bot receiving a request for the passphrase from a requestor, invoking the get key executable binary to:
        utilize the in-built predefined encryption key to decrypt the verified user identifier, the passphrase, and the bot expiry time from the encrypted information;
        obtain a logged-in user identifier and a current time from a device executing the get key executable binary to implement the get key bot; and
        in response to successfully verifying that the logged-in user identifier matches the verified user identifier and that the current time is within the timeframe specified by the bot expiry time, providing the passphrase to the requestor, otherwise, deny access to the passphrase.

2. The method of claim 1, wherein the creating encrypted information comprises:
    utilizing the in-built predefined encryption key to encrypt, for inclusion within the encrypted information, a device identifier of a designated device allowed to utilize the get key bot, wherein the device identifier comprises at least one of a machine IP address or a machine MAC address.

3. The method of claim 2, comprising:
    in response to receiving the request, obtaining a current device identifier of the designated device; and
    in response to successfully verifying that the logged-in user identifier matches the verified user identifier, that the current time is within the timeframe specified by the bot expiry time, and that the current device identifier matches the device identifier, providing the passphrase to the requestor, otherwise, denying access to the passphrase.

4. The method of claim 1, wherein the creating encrypted information comprises:
    creating a key value pair to include the passphrase paired with an application; and
    utilizing the in-built predefined encryption key to encrypt the key value pair for inclusion within the encrypted information.

5. The method of claim 1, wherein the creating encrypted information comprises:
    creating a whitelist to include key value pairs of passphrases and applications or virtual machines paired with the passphrases; and
    utilizing the in-built predefined encryption key to encrypt the whitelist for inclusion within the encrypted information.

6. The method of claim 1, comprising:
    implementing a set key bot to generate C-Code for executing the set key workflow to create the get key bot.

7. The method of claim 6, comprising:
    generating, by the set key bot, the get key executable binary using the C-Code to create the get key bot.

8. The method of claim 7, wherein the set key bot and the get key bot are hosted as a silent password teller bot as a user generated executable binary.

9. A computing device, comprising:
    a memory comprising machine executable code; and
    a processor coupled to the memory, the processor configured to execute the machine executable code to cause the machine to perform operations comprising:
        executing a set key workflow to generate a get key executable binary implemented as a get key bot, wherein the executing comprises:
            creating encrypted information utilizing an in-built predefined encryption key to encrypt a verified user identifier, a passphrase, and bot expiry time corresponding to a timeframe during which the get key bot is valid for providing the passphrase; and
            encapsulating the get key executable binary with the encrypted information to create the get key bot; and
        in response to the get key bot receiving a request for the passphrase from a requestor, invoking the get key executable binary to:
            utilize the in-built predefined encryption key to decrypt the verified user identifier, the passphrase, and the bot expiry time from the encrypted information;
            obtain a logged-in user identifier and a current time from a device executing the get key executable binary to implement the get key bot; and
            in response to successfully verifying that the logged-in user identifier matches the verified user identifier and that the current time is within the timeframe specified by the bot expiry time, providing the passphrase to the requestor, otherwise, deny access to the passphrase.

10. The computing device of claim 9, wherein the requestor is an application, and wherein the request is verified as being received during runtime of the application.

11. The computing device of claim 9, wherein the get key bot restricts access to the passphrase except for an owner or authenticated user specified within the encrypted information, and wherein the get key bot overrides access privileges of a root user or admin user from accessing the passphrase when the root user or the admin user are not specified within the encrypted information as having access to the passphrase.

12. The computing device of claim 9, wherein the operations comprise:
maintaining, as part of the encrypted information, a whitelist populated with user identifiers of whitelisted users that are allowed to access passphrases maintained by the get key bot, passphrase names, values associated with the passphrases, and device identifiers of devices from which the passphrases are allowed to be accessed.

13. The computing device of claim 12, wherein the whitelist is populated with a bot expiry date and time until which a whitelisted user must be given access to a designated passphrase.

14. The computing device of claim 12, wherein a user that owns a host device hosting the get key bot is granted access to define information populated within the whitelist.

15. A non-transitory machine readable medium comprising instructions for performing a method, which when executed by a machine, causes the machine to perform operations comprising:
executing a set key workflow to generate a get key executable binary implemented as a get key bot, wherein the executing comprises:
creating encrypted information utilizing an in-built predefined encryption key to encrypt a verified user identifier, a passphrase, and bot expiry time corresponding to a timeframe during which the get key bot is valid for providing the passphrase; and
encapsulating the get key executable binary with the encrypted information to create the get key bot; and
in response to the get key bot receiving a request for the passphrase from a requestor, invoking the get key executable binary to:
utilize the in-built predefined encryption key to decrypt the verified user identifier, the passphrase, and the bot expiry time from the encrypted information;
obtain a logged-in user identifier and a current time from a device executing the get key executable binary to implement the get key bot; and
in response to successfully verifying that the logged-in user identifier matches the verified user identifier and that the current time is within the timeframe specified by the bot expiry time, providing the passphrase to the requestor, otherwise, deny access to the passphrase.

16. The non-transitory machine readable medium of claim 15, wherein the operations comprise:
utilizing a set key bot and the get key bot to store protected environment variables hidden from external and unauthorized users.

17. The non-transitory machine readable medium of claim 16, wherein the set key bot is hosted as a first portable executable binary and the get key bot to is hosted as a second portable executable binary, and wherein the set key bot and the get key bot to can be separately transported from one computing device to a different computing device for execution without external libraries.

18. The non-transitory machine readable medium of claim 15, wherein the get key bot overrides additional access privileges of super users in relation to normal users, wherein the super users include root users, admin users, and pseudo users.

19. The non-transitory machine readable medium of claim 15, wherein the operations comprise:
utilizing the in-built predefined encryption key to encrypt, for inclusion within the encrypted information, a device identifier of a designated device allowed to utilize the get key bot, wherein the device identifier comprises at least one of a machine IP address or a machine MAC address;
in response to receiving the request, obtaining a current device identifier of the designated device; and
in response to successfully verifying that the logged-in user identifier matches the verified user identifier, that the current time is within the timeframe specified by the bot expiry time, and that the current device identifier matches the device identifier, providing the passphrase to the requestor, otherwise, denying access to the passphrase.

20. The non-transitory machine readable medium of claim 15, wherein the operations comprise:
executing a set key function to create a set of passwords assigned to the get key bot to manage, wherein labels are assigned to the set of passwords, and wherein the set of passwords and labels are encrypted and encapsulated within the get key executable binary;
in response to the get key bot receiving a get key command with a label, querying the set of passwords using the label to identify a password assigned the label; and
performing a verification to determine whether to provide the password in response to the get key command.

* * * * *